(12) United States Patent
Xu et al.

(10) Patent No.: US 12,471,286 B2
(45) Date of Patent: Nov. 11, 2025

(54) THREE-DIMENSIONAL MEMORY DEVICES, SYSTEMS, AND METHODS FOR FORMING THE SAME

(71) Applicant: YANGTZE MEMORY TECHNOLOGIES CO., LTD., Wuhan (CN)

(72) Inventors: Wenshan Xu, Wuhan (CN); Xin Wang, Wuhan (CN)

(73) Assignee: YANGTZE MEMORY TECHNOLOGIES CO., LTD., Wuhan (CN)

(*) Notice: Subject to any disclaimer, the term of this patent is extended or adjusted under 35 U.S.C. 154(b) by 624 days.

(21) Appl. No.: 17/876,311

(22) Filed: Jul. 28, 2022

(65) Prior Publication Data

US 2024/0040789 A1  Feb. 1, 2024

(51) Int. Cl.
| | |
|---|---|
| *H10B 43/40* | (2023.01) |
| *H10B 41/27* | (2023.01) |
| *H10B 41/41* | (2023.01) |
| *H10B 43/27* | (2023.01) |

(52) U.S. Cl.
CPC ............. *H10B 43/40* (2023.02); *H10B 41/27* (2023.02); *H10B 41/41* (2023.02); *H10B 43/27* (2023.02)

(58) Field of Classification Search
CPC ........ H10B 43/40; H10B 41/27; H10B 41/41; H10B 43/27; H10D 30/6728; H10D 30/6757; H10D 64/01; H10D 64/512
See application file for complete search history.

(56) References Cited

U.S. PATENT DOCUMENTS

2019/0371414 A1* 12/2019 Nguyen ................. G11C 16/08
2022/0051743 A1*  2/2022 Zhang ................... G11C 16/20

* cited by examiner

*Primary Examiner* — Patricia D Valenzuela
(74) *Attorney, Agent, or Firm* — BAYES PLLC

(57) ABSTRACT

A three-dimensional 3D memory device includes a substrate, a peripheral device disposed on the substrate, a memory stack disposed above the peripheral device and including a plurality of conductor/dielectric layer pairs, and a plurality of memory strings, each of the memory strings extending through the memory stack. The peripheral device includes at least a transistor disposed on the substrate. The transistor includes a gate stack. The gate stack of the transistor includes a staircase structure, and an operational voltage of the transistor is above 5 volts.

20 Claims, 12 Drawing Sheets

THREE-DIMENSIONAL MEMORY DEVICES, SYSTEMS, AND METHODS FOR FORMING THE SAME

BACKGROUND

The present disclosure relates to memory devices and fabrication methods thereof, and specifically, relates to the three-dimensional (3D) memory devices and fabrication methods thereof.

Planar memory cells are scaled to smaller sizes by improving process technology, circuit design, programming algorithm, and fabrication process. However, as feature sizes of the memory cells approach a lower limit, planar process and fabrication techniques become challenging and costly. As a result, memory density for planar memory cells approaches an upper limit.

A 3D memory architecture can address the density limitation in planar memory cells. The 3D memory architecture includes a memory array and peripheral circuits for facilitating operations of the memory array.

SUMMARY

Implementations of 3D memory devices and methods for forming the same are disclosed herein.

In one aspect, a 3D memory device includes a substrate, a peripheral device disposed on the substrate, a memory stack disposed above the peripheral device and including a plurality of conductor/dielectric layer pairs, and a plurality of memory strings, each of the memory strings extending through the memory stack. The peripheral device includes at least a transistor disposed on the substrate. The transistor includes a gate stack. The gate stack of the transistor includes a staircase structure, and an operational voltage of the transistor is above 5 volts.

In some implementations, a channel length of the transistor is larger than 1 micrometer. In some implementations, a channel width of the transistor is larger than 500 nanometers.

In some implementations, a first top surface of the gate stack above a channel area of the transistor is higher than a second top surface of the gate stack outside the channel area of the transistor. In some implementations, the first top surface of the gate stack is 50 nanometers to 200 nanometers higher than the second top surface of the gate stack.

In some implementations, the transistor further includes a trench isolation structure and a semiconductor body beneath the gate stack, and a top surface of the semiconductor body is higher than a top surface of the trench isolation structure. In some implementations, the top surface of the semiconductor body is 50 nanometers to 200 nanometers higher than the top surface of the trench isolation structure.

In some implementations, the gate stack includes polysilicon.

In another aspect, a system includes a 3D memory device configured to store data and a memory controller coupled to the 3D memory device. The 3D memory device includes a substrate, a peripheral device disposed on the substrate, a memory stack disposed above the peripheral device and including a plurality of conductor/dielectric layer pairs, and a plurality of memory strings, each of the memory strings extending through the memory stack. The peripheral device includes at least a transistor disposed on the substrate. The transistor includes a gate stack. The gate stack of the transistor includes a staircase structure, and an operational voltage of the transistor is above 5 volts. The memory controller is coupled to the 3D memory device and configured to control operations of the plurality of memory strings through the peripheral device.

In still another aspect, a method for forming a 3D memory device is disclosed. A peripheral device including at least a transistor is formed on a substrate. A trench isolation structure is formed in the substrate to define an active region of the transistor. The trench isolation structure is formed on two sides of a semiconductor body, and a top surface of the semiconductor body is higher than a top surface of the trench isolation structure. A gate dielectric layer is formed on the semiconductor body. A gate conductive layer is formed on the gate dielectric layer. An implantation operation is performed to form a first terminal and a second terminal of the transistor, and defines a channel area of the transistor between the first terminal and the second terminal in the semiconductor body. An insulation layer is formed over the gate stack, the source, the drain, and the semiconductor body. A memory stack is formed on the peripheral device.

In some implementations, a trench is formed in the substrate on two sides of the semiconductor body, an isolation layer is formed in the trench, and a top portion of the isolation layer is removed to form the trench isolation structure and make the top surface of the semiconductor body higher than the top surface of the trench isolation structure.

In some implementations, a planarization operation is performed to remove the top portion of the isolation layer, and a etch operation is performed on a top surface of the isolation layer.

In some implementations, the top surface of the semiconductor body is formed 50 nanometers to 200 nanometers higher than the top surface of the trench isolation structure.

In some implementations, after forming the gate conductive layer on the gate dielectric layer, the gate conductive layer forms a staircase structure.

In some implementations, the staircase structure of the gate conductive layer includes a first top surface above the channel area and a second top surface outside the channel area, and the first top surface of the gate conductive layer above the channel area is formed higher than the second top surface of the gate conductive layer outside the channel area.

In some implementations, the first top surface of the gate conductive layer is formed 50 nanometers to 200 nanometers higher than the second top surface of the gate conductive layer.

In some implementations, an operational voltage of the transistor is above 5 volts. In some implementations, a channel length of the transistor is larger than 1 micrometer. In some implementations, a channel width of the transistor is larger than 500 nanometers.

In some implementations, the gate conductive layer includes polysilicon.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
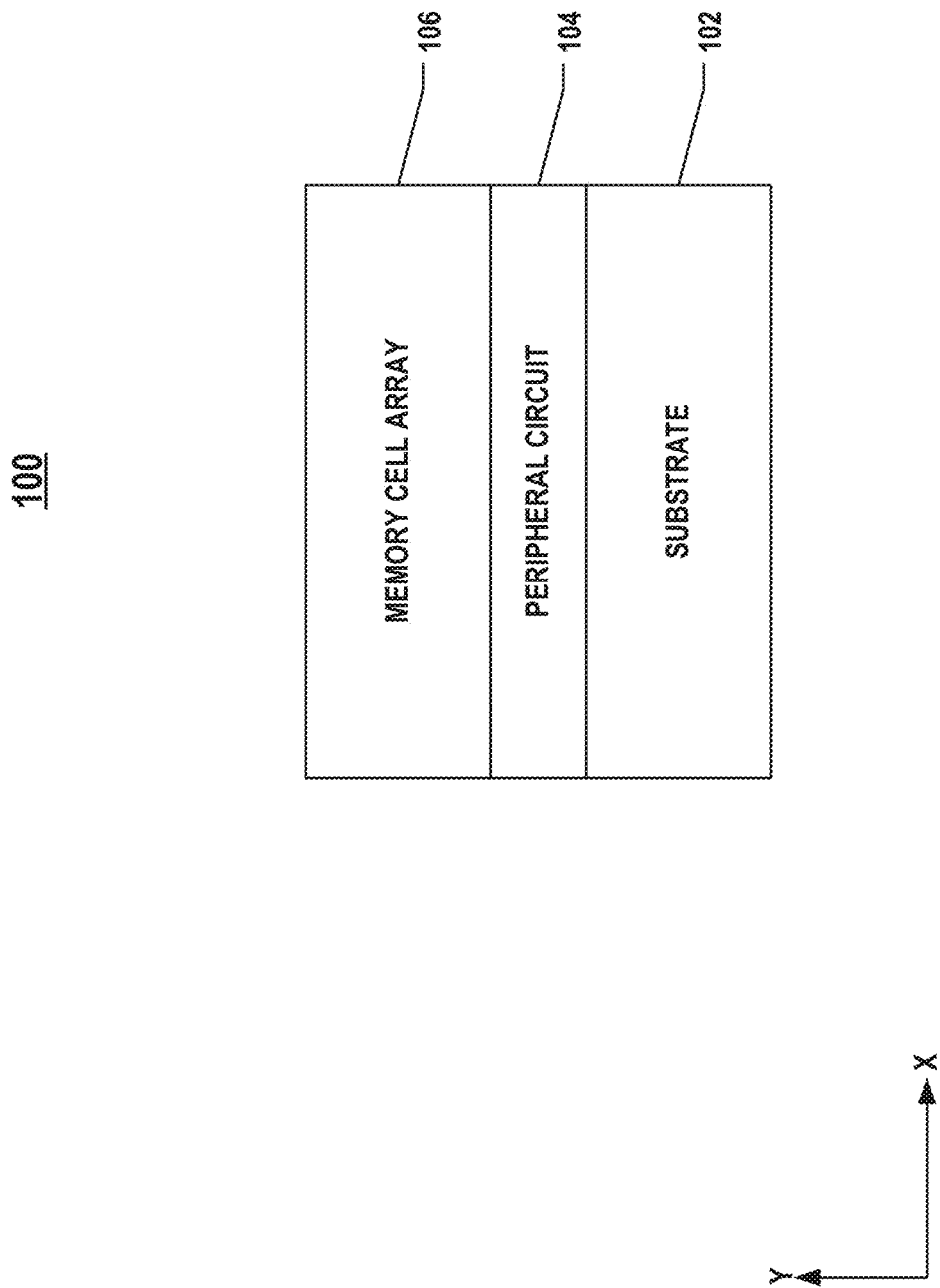
FIG. 1 illustrates a schematic view of a cross-section of a 3D memory device, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations), and the spatially relative descriptors used herein may likewise be interpreted accordingly.

As used herein, the term "layer" refers to a material portion including a region with a thickness. A layer can extend over the entirety of an underlying or overlying structure or may have an extent less than the extent of an underlying or overlying structure. Further, a layer can be a region of a homogeneous or inhomogeneous continuous structure that has a thickness less than the thickness of the continuous structure. For example, a layer can be located between any pair of horizontal planes between, or at, a top surface and a bottom surface of the continuous structure. A layer can extend horizontally, vertically, and/or along a tapered surface. A substrate can be a layer, can include one or more layers therein, and/or can have one or more layers thereupon, thereabove, and/or therebelow. A layer can include multiple layers. For example, an interconnect layer can include one or more conductors and contact layers (in which interconnect lines and/or vertical interconnect access (via) contacts are formed) and one or more dielectric layers.

With the development of 3D memory devices, such as 3D NAND Flash memory devices, the more stacked layers (e.g., more word lines and the resulting more memory cells) require more peripheral circuits (and the components, e.g., transistors, forming the peripheral circuits) for operating the 3D memory devices. For example, the number and/or size of page buffers needs to increase to match the increased number of memory cells. In another example, the number of string drivers in the word line driver is proportional to the number of word lines in the 3D NAND Flash memory. Thus, the continuous increase of the word lines also increases the area occupied by the word line driver, as well as the complexity of metal routings, sometimes even the number of metal layers.

Thus, it is desirable to reduce the planar areas occupied by the peripheral circuits of the 3D memory devices with the increased numbers of peripheral circuits and the transistors thereof. However, scaling down the transistor size of the peripheral circuits following the advanced complementary metal-oxide-semiconductor (CMOS) technology node trend used for the logic devices would cause a significant cost increase and higher leakage current, which are undesirable for memory devices. Moreover, because the 3D NAND Flash memory devices require a relatively high voltage (e.g., above 5 V) in certain memory operations, such as program and erase, unlike logic devices, which can reduce its working voltage as the CMOS technology node advances, the voltage provided to the memory peripheral circuits cannot be reduced. As a result, scaling down the memory peripheral circuit sizes by following the trend for advancing the CMOS technology nodes, like the normal logic devices, becomes infeasible.

In some implementations, the substrate (the body terminal) of the high-voltage devices in the peripheral circuits may be provided with a bias voltage, e.g., a negative voltage, and therefore the body-source voltage (Vsb) is not equal to zero. When Vsb>0 (source is more positive than the body), the forward-biased junction Vsb will increase the threshold voltage (Vt) of the transistor. When Vsb<0 (source is more negative than the body), the reverse-biased junction and depletion layer will increase with reduction in channel length between source and drain, so that it may attract more electrons to conduct in the channel, and as a result, Vt will also increase.

The increased threshold voltage will slow down the on/off speed of the transistors and may also cause voltage transmission loss in the peripheral circuits. To address one or more of the abovementioned issues, the present disclosure introduces various solutions in which the transistors in the peripheral circuits of the 3D memory device may include a gate stack having a staircase shape, so that can enhance the control of the well region (the channel area) of the transistor to improve the body effect of the transistor. As a result, the operation speed of the transistors in the peripheral circuits of the 3D memory device can be further improved.

FIG. 1 illustrates a schematic view of a cross-section of a 3D memory device 100, according to some aspects of the present disclosure. 3D memory device 100 represents an example of a periphery under cell (PUC) structure. In some implementations, a peripheral circuit 104 may be first formed on a substrate 102, and a memory cell array 106 may then be formed on peripheral circuit 104. In some implementations, peripheral circuit 104 may be formed over substrate 102, and a semiconductor layer, e.g., a polysilicon layer, may be formed over peripheral circuit 104. Memory cell array 106 may be formed over the semiconductor layer.

It is noted that x- and y-axes are added in FIG. 1 to further illustrate the spatial relationships of the components of a semiconductor device. Substrate 102 of 3D memory device 100 includes two lateral surfaces (e.g., a top surface and a bottom surface) extending laterally in the x-direction (the lateral direction or width direction). As used herein, whether one component (e.g., a layer or a device) is "on," "above," or "below" another component (e.g., a layer or a device) of a semiconductor device is determined relative to substrate 102 of 3D memory device 100 in the y-direction (the vertical direction or thickness direction). The same notion for describing the spatial relationships is applied throughout the present disclosure.

In some implementations, memory cell array 106 includes an array of NAND Flash memory cells. For ease of description, a NAND Flash memory cell array may be used as an example for describing memory cell array 106 in the present disclosure. But it is understood that memory cell array 106 is not limited to NAND Flash memory cell array and may include any other suitable types of memory cell arrays, such as NOR Flash memory cell array, phase change memory (PCM) cell array, resistive memory cell array, magnetic memory cell array, spin transfer torque (STT) memory cell array, to name a few.

Memory cell array 106 may be a NAND Flash memory device in which memory cells are provided in the form of an array of 3D NAND memory strings and/or an array of two-dimensional (2D) NAND memory cells. NAND memory cells can be organized into pages or fingers, which are then organized into blocks in which each NAND memory cell is coupled to a separate line called a bit line (BL). All cells with the same vertical position in the NAND memory cell can be coupled through the control gates by a word line (WL). In some implementations, a memory plane contains a certain number of blocks that are coupled through the same bit line. Memory cell array 106 may include one or more memory planes, and the peripheral circuits that are needed to perform all the read/program (write)/erase operations can be included in peripheral circuit 104.

In some implementations, the array of NAND memory cells is an array of 2D NAND memory cells, each of which includes a floating-gate transistor. The array of 2D NAND memory cells includes a plurality of 2D NAND memory strings, each of which includes a plurality of memory cells connected in series (resembling a NAND gate) and two select transistors, according to some implementations. Each 2D NAND memory string is arranged in the same plane (e.g., referring to herein a flat, two-dimensional (2D) surface, different from the term "memory plane" in the present discourse) on the substrate, according to some implementations. In some implementations, the array of NAND memory cells is an array of 3D NAND memory strings, each of which extends vertically above the substrate (in 3D) through a stack structure, e.g., a memory stack. Depending on the 3D NAND technology (e.g., the number of layers/tiers in the memory stack), a 3D NAND memory string typically includes a certain number of NAND memory cells, each of which includes a floating-gate transistor or a charge-trap transistor.

As shown in FIG. 1, 3D memory device 100 may include peripheral circuit 104 of memory cell array 106. Peripheral circuit 104 (a.k.a. control and sensing circuits) can include any suitable digital, analog, and/or mixed-signal circuits used for facilitating the operations of memory cell array 106. For example, peripheral circuit 104 can include one or more of a page buffer, a decoder (e.g., a row decoder and a column decoder), a sense amplifier, a driver (e.g., a word line driver), an input/output (I/O) circuit, a charge pump, a voltage source or generator, a current or voltage reference, any portions (e.g., a sub-circuit) of the functional circuits mentioned above, or any active or passive components of the circuit (e.g., transistors, diodes, resistors, or capacitors). Peripheral circuit 104 may use CMOS technology, which can be implemented with logic processes in any suitable technology nodes.

Figure 2:
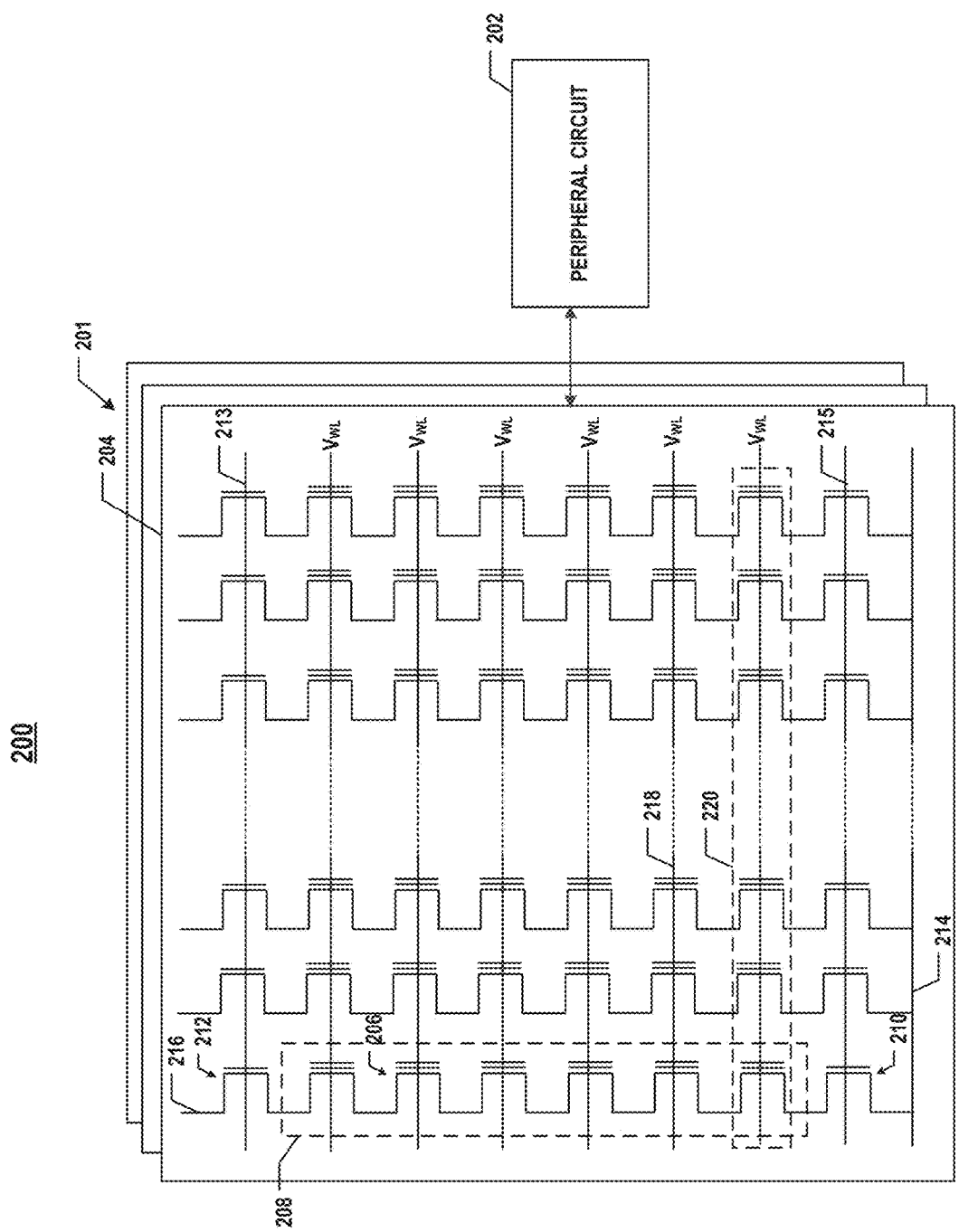
FIG. 2 illustrates a schematic circuit diagram of a memory device including peripheral circuits, according to some aspects of the present disclosure.

FIG. 2 illustrates a schematic circuit diagram of a memory device 200 including peripheral circuits, according to some aspects of the present disclosure. Memory device 200 can include a memory cell array 201 and peripheral circuits 202 coupled to memory cell array 201. 3D memory device 100 may be examples of memory device 200 in which memory cell array 201 and at least peripheral circuits 202 may be included in peripheral circuit 104.

Memory cell array 201 can be a NAND Flash memory cell array in which memory cells 206 are provided in the form of an array of NAND memory strings 208 each extending vertically above a substrate (not shown in FIG. 2). In some implementations, each NAND memory string 208 includes a plurality of memory cells 206 coupled in series and stacked vertically. Each memory cell 206 can hold a continuous, analog value, such as an electrical voltage or charge, that depends on the number of electrons trapped within a region of memory cell 206. Each memory cell 206 can be either a floating gate type of memory cell including a floating-gate transistor or a charge trap type of memory cell including a charge-trap transistor.

In some implementations, each memory cell 206 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 206 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 2, each NAND memory string 208 can include a source select gate (SSG) transistor 210 at its source end and a drain select gate (DSG) transistor 212 at its drain end. SSG transistor 210 and DSG transistor 212 can be configured to activate selected NAND memory strings 208 (columns of the array) during read and program operations. In some implementations, SSG transistors 210 of NAND memory strings 208 in the same block 204 are coupled through a same source line (SL) 214, e.g., a common SL, for example, to the ground. DSG transistor 212 of each NAND memory string 208 is coupled to a respective bit line 216 from which data can be read or programmed via an output bus (not shown), according to some implementations. In some implementations, each NAND memory string 208 is configured to be selected or deselected by applying a select voltage (e.g., above the threshold voltage of DSG transistor 212) or a deselect voltage (e.g., 0 V) to respective DSG transistor 212 through one or more DSG lines 213 and/or by applying a select voltage (e.g., above the threshold voltage of SSG transistor 210) or a deselect voltage (e.g., 0 V) to respective SSG transistor 210 through one or more SSG lines 215.

As shown in FIG. 2, NAND memory strings 208 can be organized into multiple blocks 204, each of which can have a common source line 214. In some implementations, each block 204 is the basic data unit for erase operations, e.g., all memory cells 206 on the same block 204 are erased at the same time. Memory cells 206 of adjacent NAND memory strings 208 can be coupled through word lines 218 that select which row of memory cells 206 is affected by read and program operations. In some implementations, each word line 218 is coupled to a page 220 of memory cells 206, which is the basic data unit for program and read operations. The size of one page 220 in bits can correspond to the number of NAND memory strings 208 coupled by word line 218 in one block 204. Each word line 218 can include a plurality of control gates (gate electrodes) at each memory cell 206 in respective page 220 and a gate line coupling the control gates.

Figure 3:
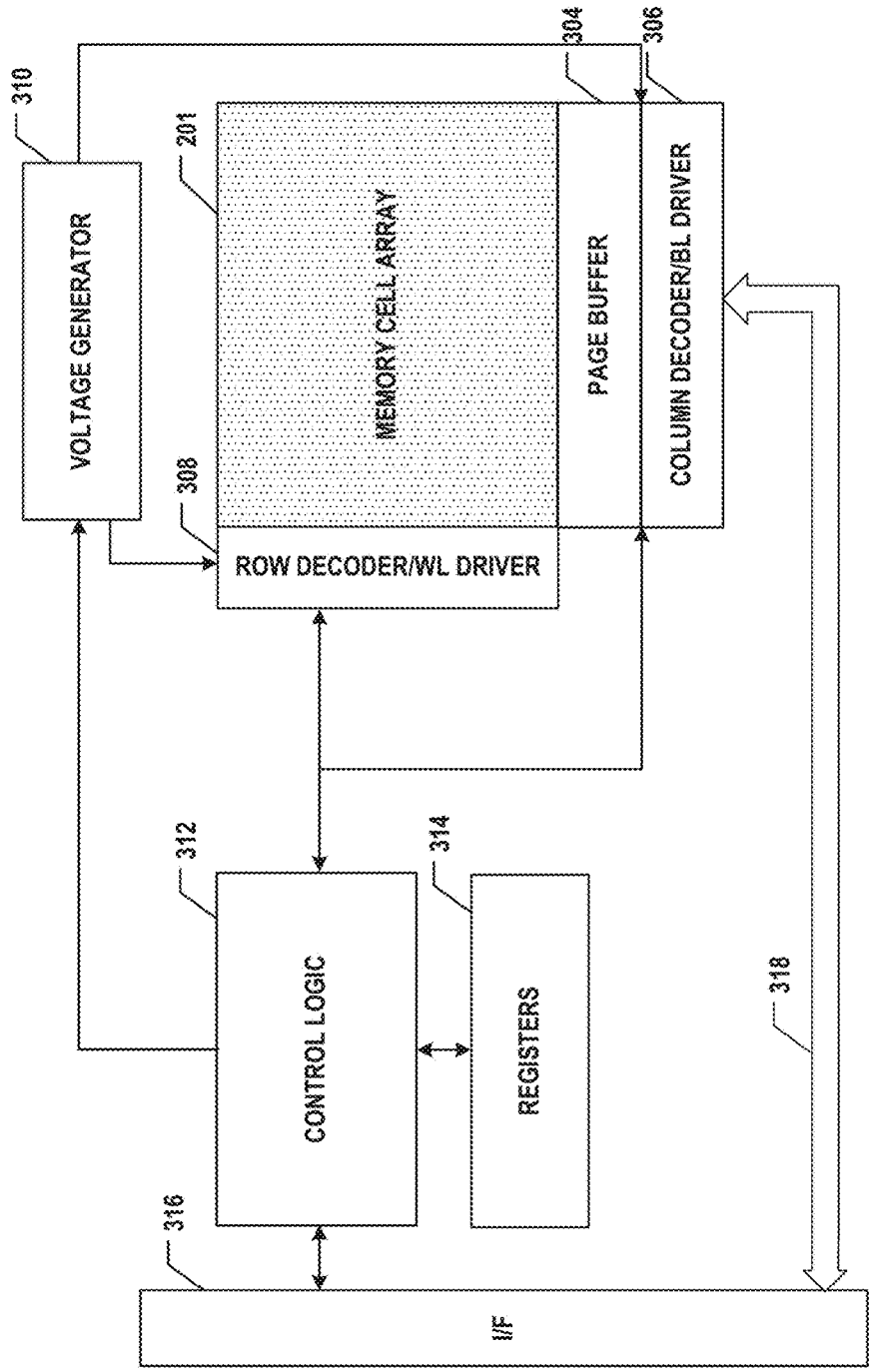
FIG. 3 illustrates a block diagram of a memory device including a memory cell array and peripheral circuits, according to some aspects of the present disclosure.

Peripheral circuits 202 can be coupled to memory cell array 201 through bit lines 216, word lines 218, source lines 214, SSG lines 215, and DSG lines 213. As described above, peripheral circuits 202 can include any suitable circuits for facilitating the operations of memory cell array 201 by applying and sensing voltage signals and/or current signals through bit lines 216 to and from each target memory cell 206 through word lines 218, source lines 214, SSG lines 215, and DSG lines 213. Peripheral circuits 202 can include various types of peripheral circuits formed using CMOS technologies. For example, FIG. 3 illustrates some exemplary peripheral circuits 202 including a page buffer 304, a column decoder/bit line driver 306, a row decoder/word line driver 308, a voltage generator 310, control logic 312, registers 314, an interface (UF) 316, and a data bus 318. It is understood that in some examples, additional peripheral circuits 202 may be included as well.

Page buffer 304 can be configured to buffer data read from or programmed to memory cell array 201 according to the control signals of control logic 312. In one example, page buffer 304 may store one page of program data (write data) to be programmed into one page 220 of memory cell array 201. In another example, page buffer 304 also performs program verify operations to ensure that the data has been properly programmed into memory cells 206 coupled to selected word lines 218.

Row decoder/word line driver 308 can be configured to be controlled by control logic 312 and select block 204 of memory cell array 201 and a word line 218 of selected block 204. Row decoder/word line driver 308 can be further configured to drive memory cell array 201. For example, row decoder/word line driver 308 may drive memory cells 206 coupled to the selected word line 218 using a word line voltage generated from voltage generator 310.

Column decoder/bit line driver 306 can be configured to be controlled by control logic 312 and select one or more 3D NAND memory strings 208 by applying bit line voltages generated from voltage generator 310. For example, column decoder/bit line driver 306 may apply column signals for selecting a set of N bits of data from page buffer 304 to be outputted in a read operation.

Control logic 312 can be coupled to each peripheral circuit 202 and configured to control operations of peripheral circuits 202. Registers 314 can be coupled to control logic 312 and include status registers, command registers, and address registers for storing status information, command operation codes (OP codes), and command addresses for controlling the operations of each peripheral circuit 202.

Interface 316 can be coupled to control logic 312 and configured to interface memory cell array 201 with a memory controller (not shown). In some implementations, interface 316 acts as a control buffer to buffer and relay control commands received from the memory controller and/or a host (not shown) to control logic 312 and status information received from control logic 312 to the memory controller and/or the host. Interface 316 can also be coupled to page buffer 304 and column decoder/bit line driver 306 via data bus 318 and act as an I/O interface and a data buffer to buffer and relay the program data received from the memory controller and/or the host to page buffer 304 and the read data from page buffer 304 to the memory controller and/or the host. In some implementations, interface 316 and data bus 318 are parts of an I/O circuit of peripheral circuits 202.

Voltage generator 310 can be configured to be controlled by control logic 312 and generate the word line voltages (e.g., read voltage, program voltage, pass voltage, local voltage, and verification voltage) and the bit line voltages to be supplied to memory cell array 201. In some implementations, voltage generator 310 is part of a voltage source that provides voltages at various levels of different peripheral circuits 202 as described below in detail. Consistent with the scope of the present disclosure, in some implementations, the voltages provided by voltage generator 310, for example, to row decoder/word line driver 308, column decoder/bit line driver 306, and page buffer 304 are above certain levels that are sufficient to perform the memory operations. For example, the voltages provided to the page buffer circuits in page buffer 304 and/or the logic circuits in control logic 312 may be between 1.3 V and 5 V, such as 3.3 V, and the voltages provided to the driving circuits in row decoder/word line driver 308 and/or column decoder/bit line driver 306 may be between 5 V and 30 V.

Figure 4A:
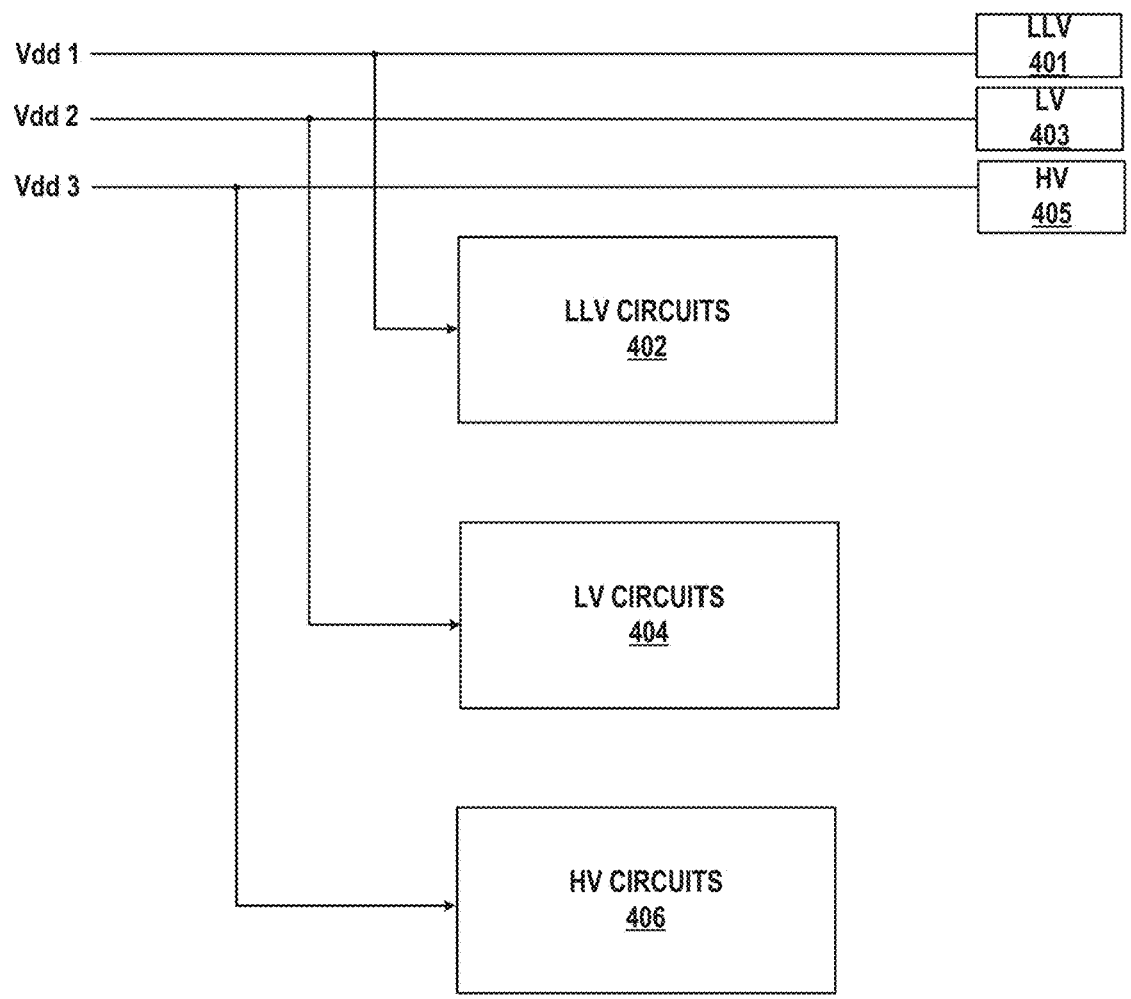
FIG. 4 illustrates a block diagram of peripheral circuits provided with various voltages, according to some aspects of the present disclosure.
Figure 4B:
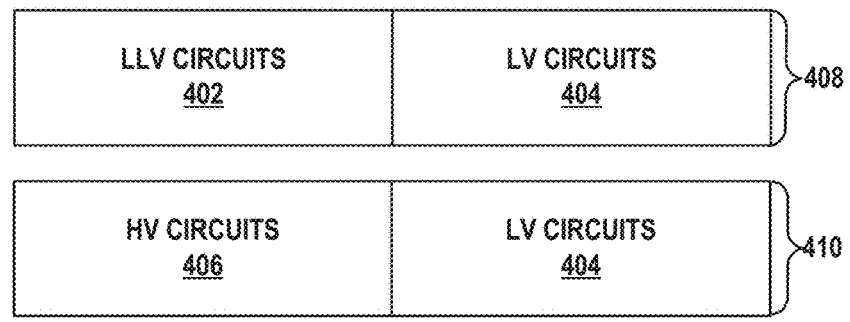

Different from logic devices (e.g., microprocessors), memory devices, such as 3D NAND Flash memory, require a wide range of voltages to be supplied to different memory peripheral circuits. For example, FIG. 4 illustrates a block diagram of peripheral circuits provided with various voltages, according to some aspects of the present disclosure. In some implementations, a memory device (e.g., memory device 200) includes a low low voltage (LLV) source 401, a low voltage (LV) source 403, and a high voltage (HV) source 405, each of which is configured to provide a voltage at a respective level (Vdd1, Vdd2, or Vdd3). For example, Vdd3>Vdd2>Vdd1. Each voltage source 401, 403, or 405 can receive a voltage input at a suitable level from an external power source (e.g., a battery). Each voltage source 401, 403, or 405 can also include voltage converters and/or voltage regulators to convert the external voltage input to the respective level (Vdd1, Vdd2, or Vdd3) and maintain and output the voltage at the respective level (Vdd1, Vdd2, or Vdd3) through a corresponding power rail. In some implementations, voltage generator 310 of memory device 200 is part of voltage sources 401, 403, and 405.

In some implementations, LLV source 401 is configured to provide a voltage below 1.3 V, such as between 0.9 V and 1.2 V (e.g., 0.9 V, 0.95 V, 1 V, 1.05 V, 1.1 V, 1.15 V, 1.2 V, any range bounded by the lower end by any of these values, or in any range defined by any two of these values). In one example, the voltage is 1.2 V. In some implementations, LV source 403 is configured to provide a voltage between 1.3 V and 3.3 V (e.g., 1.3 V, 1.4 V, 1.5 V, 1.6 V, 1.7 V, 1.8 V, 1.9 V, 2 V, 2.1 V, 2.2 V, 2.3 V, 2.4 V, 2.5 V, 2.6 V, 2.7 V, 2.8 V, 2.9 V, 3 V, 3.1 V, 3.2 V, 3.3 V, any range bounded by the lower end by any of these values, or in any range defined by any two of these values). In one example, the voltage is 3.3 V. In some implementations, HV source 405 is configured to provide a voltage greater than 3.3 V, such as between 5 V and 30 V (e.g., 5 V, 6 V, 7 V, 8 V, 9 V, 10 V, 11 V, 12 V, 13 V, 14 V, 15 V, 16 V, 17 V, 18 V, 19 V, 20 V, 21 V, 22 V, 23 V, 24 V, 25 V, 26 V, 27 V, 28 V, 29 V, 30 V, any range bounded by the lower end by any of these values, or in any range defined by any two of these values). It is understood that the voltage ranges described above with respect to HV source 405, LV source 403, and LLV source 401 are for illustrative purposes and non-limiting, and any other suitable voltage ranges may be provided by HV source 405, LV source 403, and LLV source 401.

Based on their suitable voltage levels (Vdd1, Vdd2, or Vdd3), the memory peripheral circuits (e.g., peripheral circuits 202) can be categorized into LLV circuits 402, LV circuits 404, and HV circuits 406, which can be coupled to LLV source 401, LV source 403, and HV source 405, respectively. In some implementations, HV circuits 406 includes one or more driving circuits that are coupled to the memory cell array (e.g., memory cell array 201) through word lines, bit lines, SSG lines, DSG lines, source lines, etc., and configured to drive the memory cell array by applying a voltage at a suitable level to the word lines, bit lines, SSG lines, DSG lines, source lines, etc., when performing memory operations (e.g., read, program, or erase). In one example, HV circuit 406 may include word line driving circuits (e.g., in row decoder/word line driver 308) that are coupled to word lines and apply a program voltage (Vprog) or a pass voltage (Vpass) in the range of, for example, 5 V and 30 V, to the word lines during program operations. In another example, HV circuit 406 may include bit line driving circuits (e.g., in column decoder/bit line driver 306) that are coupled to bit lines and apply an erase voltage (Veras) in the range of, for example, 5 V and 30 V, to bit lines during erase operations. In some implementations, LV circuits 404 include page buffer circuits (e.g., in latches of page buffer 304) and are configured to buffer the data read from or programmed to the memory cell array. For example, the page buffer may be provided with a voltage of, for example, 3.3 V, by LV source 403. LV circuits 404 can also include logic circuits (e.g., in control logic 312). In some implementations, LLV circuits 402 include an I/O circuit (e.g., in interface 316 and/or data bus 318) configured to interface the memory cell array with a memory controller. For example, the I/O circuit may be provided with a voltage of, for example, 1.2 V, by LLV source 401.

In some implementations, HV circuits 406 may include a plurality of transistors, and each transistor may be operated at an operational voltage above 5 V. In some implementations, each transistor may be operated at an operational voltage between 5 V and 30 V. As described above, for improving the body effect and enhancing the operation speed of the transistor, a gate stack of the transistor may be formed in a staircase shape. For example, the gate stack of the transistor may have at least two flights having different heights of top surfaces. In some implementations, the gate stack above the channel area and the gate stack outside the channel area may have heights of top surfaces. In some implementations, the height difference between the two flights may be between 50 nanometers to 200 nanometers. As a result, the gate stack not only locates above the channel area but also covers a portion of the side of the channel, so which enhances the control of the channel area of the transistor to improve the body effect of the transistor.

Figure 5:
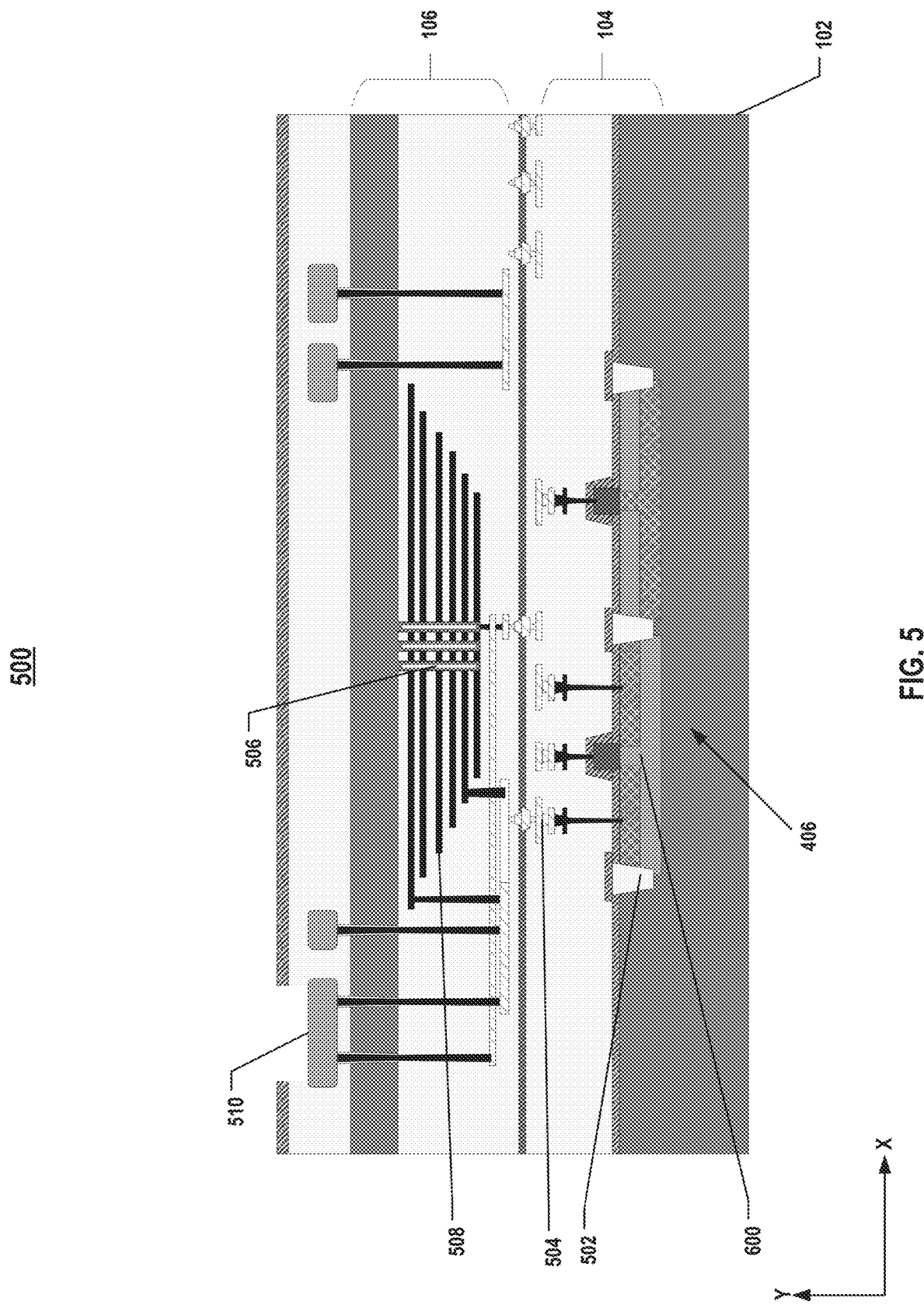
FIG. 5 illustrates a side view of a 3D memory device, according to various aspects of the present disclosure.

FIG. 5 illustrates a side view of a 3D memory device 500, according to various aspects of the present disclosure. 3D memory device 500 is a semiconductor structure including substrate 102, peripheral circuit 104, and memory cell array 106, which are formed over each other in different planes in the vertical direction (e.g., the y-direction in FIG. 5), according to some implementations. In some implementations, substrate 102 is a silicon substrate having single crystalline silicon. Devices, such as transistors, can be formed on substrate 102. It is understood that, in some implementations, peripheral circuit 104 may include LLV circuits, LV circuits, and/or HV circuits. For the purpose of better describing the present disclosure, only HV circuit 406 is shown in FIG. 5.

In some implementations, peripheral circuit 104 may include HV circuit 406, such as driving circuits (e.g., the string drivers in row decoder/word line driver 308 and drivers in column decoder/bit line driver 306), and HV circuit 406 may include a plurality of transistors formed in or above substrate 102. The transistors can include any transistors, such as planar transistors and/or 3D transistors 600. Each transistor 600 includes a gate dielectric layer, and the thickness of the gate dielectric layer of transistors 600 of HV circuit 406 is greater than the thickness of the gate dielectric layer of the transistors of LV or LLV circuits due to the higher voltage applied to HV circuit 406. Trench isolation structures 502 (e.g., shallow trench isolations (STIs)) and doped regions (e.g., wells, sources, and drains of the transistors) can be formed on substrate 102 as well.

In some implementations, peripheral circuit 104 further includes an interconnect layer 504 above HV circuit 406 to transfer electrical signals to and from peripheral circuit 104. The interconnects in interconnect layer 504 may be coupled to transistors 600 of HV circuit 406. Interconnect layer 504 may further include one or more interlayer dielectric (ILD) layers in which the lateral lines and vias can form. That is, interconnect layer 504 may include lateral lines and vias in multiple ILD layers. In some implementations, the devices in peripheral circuit 104 may be coupled to one another through the interconnects in interconnect layer 504. For example, HV circuit 406 may be coupled to other HV circuits, LV circuits, and/or LLV circuits through interconnect layer 504. The interconnects in interconnect layer 504 may include conductive materials including, but not limited to, W, Co, Cu, Al, silicides, or any combination thereof. The ILD layers in interconnect layer 504 can include dielectric materials including, but not limited to, silicon oxide, silicon nitride, silicon oxynitride, low-k dielectrics, or any combination thereof.

In some implementations, memory cell array 106 may be formed on peripheral circuit 104 or may be formed on another substrate and bonded to peripheral circuit 104, which is not limited here. FIG. 5 illustrates the structure using bonding operations.

Memory cell array 106 may include memory strings 506 extending vertically through a plurality of pairs each including a conductive layer and a dielectric layer. The stacked and interleaved conductive layers and dielectric layers are also referred to herein as a stack structure 508, e.g., a memory stack. The interleaved conductive layers and dielectric layers in the memory stack alternate in the vertical direction, according to some implementations. Each conductive layer can include a gate electrode (gate line) surrounded by an adhesive layer and a gate dielectric layer. The gate electrode of the conductive layer can extend laterally as a word line, ending at one or more staircase structures of the memory stack.

Figure 6A:
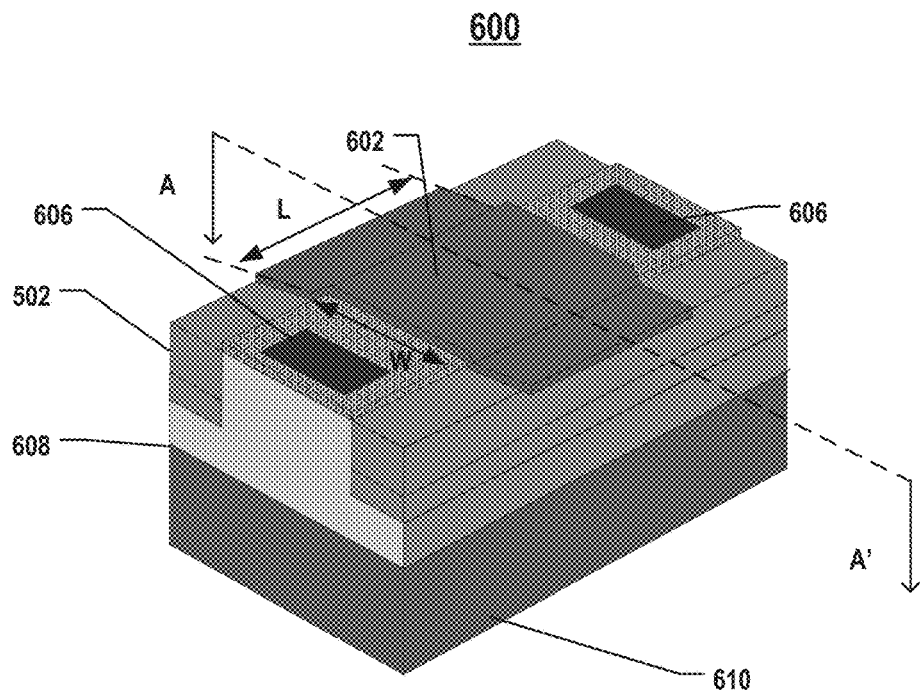
FIGS. 6A and 6B illustrate a perspective view and a side view, respectively, of a transistor, according to some aspects of the present disclosure.
Figure 6B:
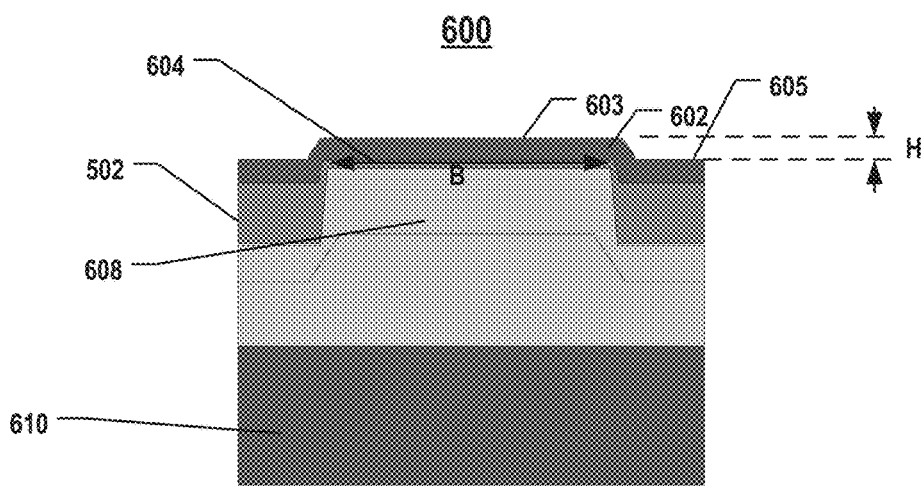

FIGS. 6A and 6B illustrate a perspective view and a side view along line AA', respectively, of transistor 600, according to some aspects of the present disclosure. As shown in FIGS. 6A and 6B, transistor 600 can be a metal-oxide semiconductor field-effect transistor (MOSFET) on substrate 102, which can include silicon (e.g., single crystalline silicon, or c-Si), SiGe, GaA, Ge, silicon-on-insulator (SOI), or any other suitable materials. A semiconductor layer 610, such as p-type semiconductor layer, may be formed on substrate 102, and a semiconductor body 608, such as an n-well layer, may be formed in and/or above the p-type semiconductor layer. It is understood that the p-type semiconductor layer and the n-well layer are used for illustration only here, and other MOSFET structures may be formed on substrate 102 as well. For example, an n-type semiconductor layer can be formed on substrate 102, a doped n-well layer may be formed in and/or above the n-type semiconductor layer, and a p-well layer may be formed in and/or above the doped n-well layer.

Semiconductor body 608 and semiconductor layer 610 are formed from substrate 102 and thus, may have the same semiconductor material as substrate 102, according to some implementations. In some implementations, semiconductor body 608 includes single crystalline silicon. Since the channels can be formed in semiconductor body 608, as opposed to substrate 102, semiconductor body 608 may be viewed as the active region for transistor 600.

Trench isolation structures 502 may be formed in semiconductor body 608 and semiconductor layer 610 and between adjacent transistors 600 to reduce current leakage. Trench isolation structures 502 can include any suitable dielectric materials, such as silicon oxide, silicon nitride, silicon oxynitride, or high dielectric constant (high-k) dielectrics (e.g., aluminum oxide, hafnium oxide, zirconium oxide, etc.). In some implementations, high-k dielectric materials include any dielectrics having a dielectric constant, or k-value, higher than that of silicon nitride (k>7). In some implementations, trench isolation structure 502 includes silicon oxide. The top surface of trench isolation structures 502 may be lower than the top surface of semiconductor body 608. In some implementations, the top surface of trench isolation structures 502 may be 50 nanometers to 200 nanometers lower than the top surface of semiconductor body 608.

As shown in FIGS. 6A and 6B, transistor 600 can also include a gate stack. In some implementations, the gate stack may include a gate dielectric layer 604 and a gate conductive layer 602 on gate dielectric layer 604, e.g., above and in contact with gate dielectric layer 604. Gate dielectric layer 604 can include any suitable dielectric materials, such as silicon oxide, silicon nitride, silicon oxynitride, or high-k dielectrics. In some implementations, gate dielectric layer 604 includes silicon oxide, which is a form of a gate oxide. Gate conductive layer 602 can include any suitable conductive materials, such as polysilicon, metals (e.g., W, Cu, Al, etc.), metal compounds (e.g., TiN, TaN, etc.), or silicides. In some implementations, gate conductive layer 602 includes doped polysilicon, which is a form of a gate poly.

Transistor 600 can further include a pair of terminals, including a first terminal and a second terminal. In some implementations, the first terminal and the second terminal may be a source and a drain 606. Source and drain 606 can be doped with any suitable P-type dopants, such as boron (B) or Gallium (Ga), or any suitable N-type dopants, such as phosphorus (P) or arsenic (As). Source and drain 606 can be separated by the gate stack in the plan view. In other words, the gate stack is formed between source and drain 606 in the plan view, according to some implementations. The channel of transistor 600 can be formed laterally between source and drain 606 under the gate stack when a gate voltage applied to gate conductive layer 602 of the gate stack is above the threshold voltage of transistor 600.

In some implementations, multiple channels can be formed on the top surface and side surfaces of semiconductor body 608, e.g., n-well layer, (the active region) in transistor 600. It is understood, although not shown in FIGS. 6A, and 6B, transistor 600 may include additional components, such as wells, spacers, and stressors (a.k.a. strain elements) at source and drain 606.

It is further understood that FIGS. 6A and 6B illustrate one example of 3D transistors that can be used in memory peripheral circuits, and any other suitable 3D transistors and/or multi-gate transistors may be used in memory peripheral circuits as well, including, for example, a gate all around (GAA) silicon on nothing (SON) transistor, a multiple independent gate FET (MIGET), a trigate FET, a H-gate FET, and a Ω-FET, a quadruple gate FET, a cylindrical FET, or a multi-bridge/stacked nanowire FET.

Gate dielectric layer 604 of transistor 600 may have a thickness designed to accommodate the voltage applied to the transistor. In some implementations, the dielectric thickness of transistor 600 in HV circuit 406 may be between 20 nm and 100 nm (e.g., 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 45 nm, 50 nm, 55 nm, 60 nm, 65 nm, 70 nm, 75 nm, 80 nm, 85 nm, 90 nm, 95 nm, 100 nm, any range bounded by the lower end by any of these values, or in any range defined by any two of these values). It is understood that the thickness may be commensurate with the HV voltage range applied to HV circuit 406, as described above in detail, such as greater than 3.3 V (e.g., between 5 V and 30 V).

In some implementations, the channel of transistor 600 may have a channel length L and a channel width W, as shown in FIG. 6A. In some implementations, channel length L may be larger than 1 micrometer. In some implementations, channel width W may be larger than 500 nanometers.

The gate stack (including gate conductive layer 602 and gate dielectric layer 604) may be a staircase structure, as shown in FIGS. 6A and 6B. The gate stack of transistor 600 may have at least two flights having different heights of top surfaces. In some implementations, the gate stack above the channel area B and the gate stack outside the channel area B may have heights of top surfaces. In some implementations, the height difference H, as shown in FIG. 6B, between the two flights may be between 50 nanometers to 200 nanometers.

In other words, the gate stack or gate conductive layer 602 may have at least two different top surface having different heights. A first top surface 603 of the gate stack formed above the channel area B of transistor 600 is higher than a second top surface 605 of the gate stack outside the channel area B of transistor 600. In some implementations, the first top surface 603 of the gate stack formed above the channel area B of transistor 600 is 50 nanometers to 200 nanometers higher than a second top surface 605 of the gate stack outside the channel area B of transistor 600.

As a result, the gate stack not only locates above the channel area B but also covers a portion of the side of the channel, which enhances the control of the channel area B of the transistor to improve the body effect of the transistor.

Figure 7:
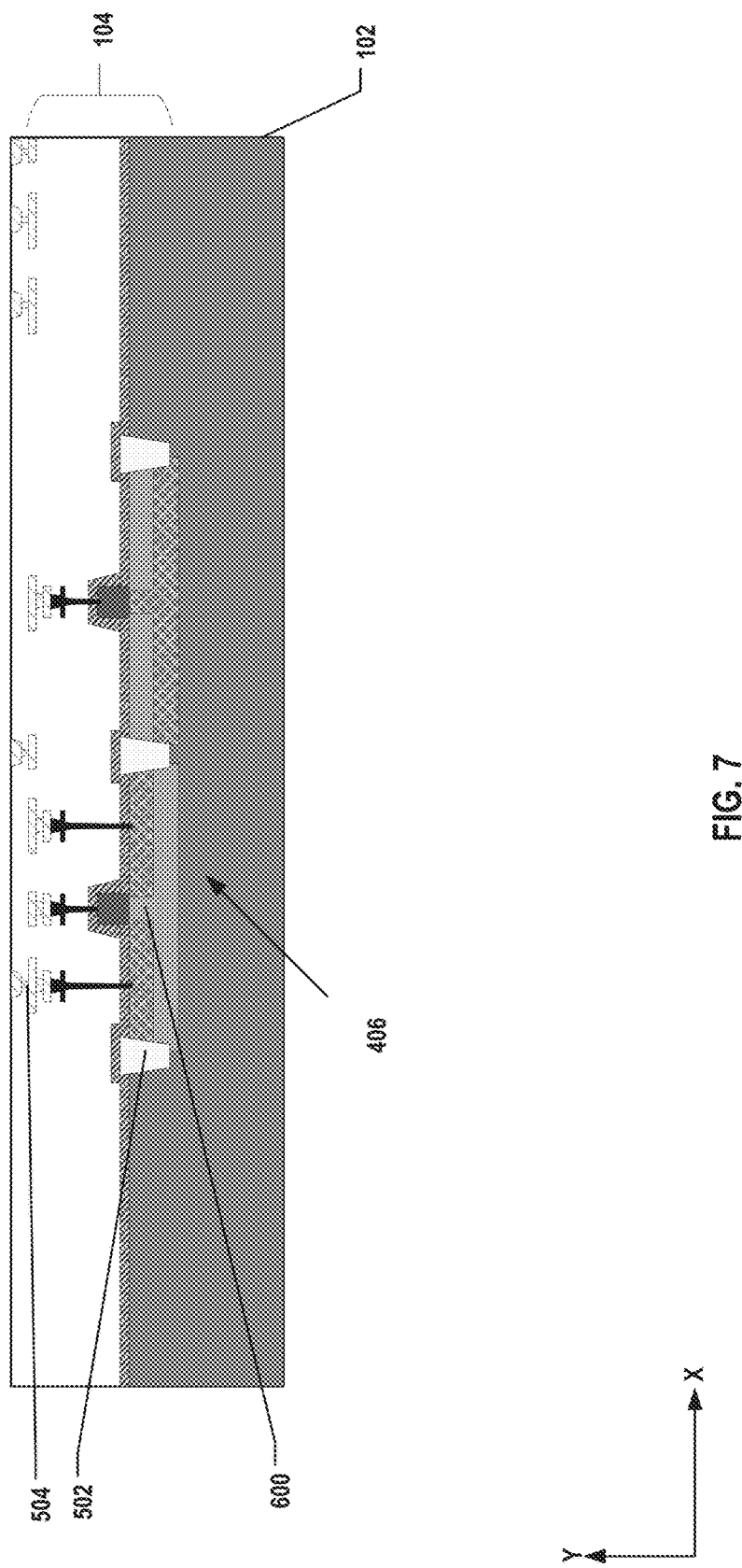
FIGS. 7-9 illustrate a fabrication process for forming a 3D memory device, according to some aspects of the present disclosure.
Figure 8:
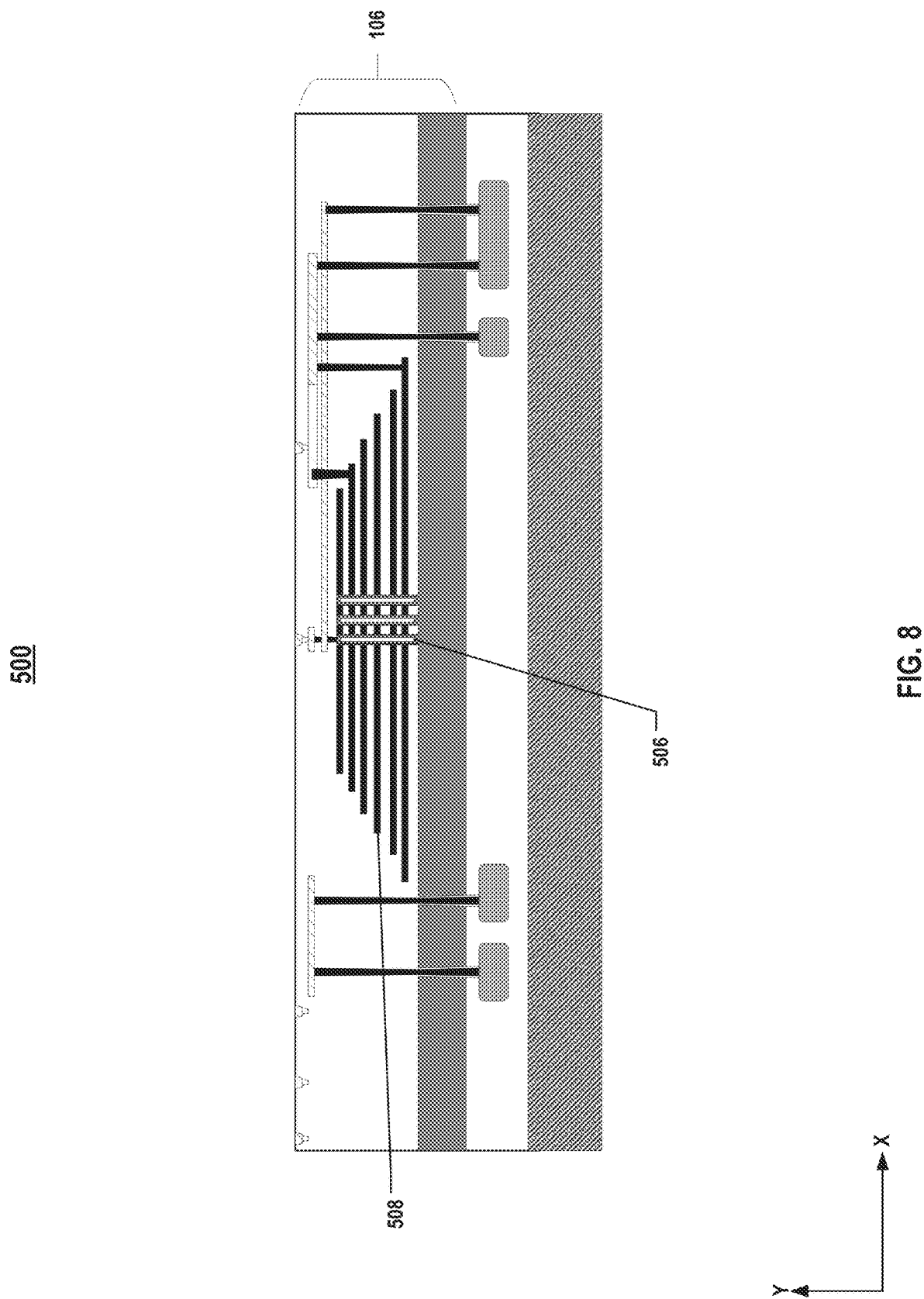
Figure 9:
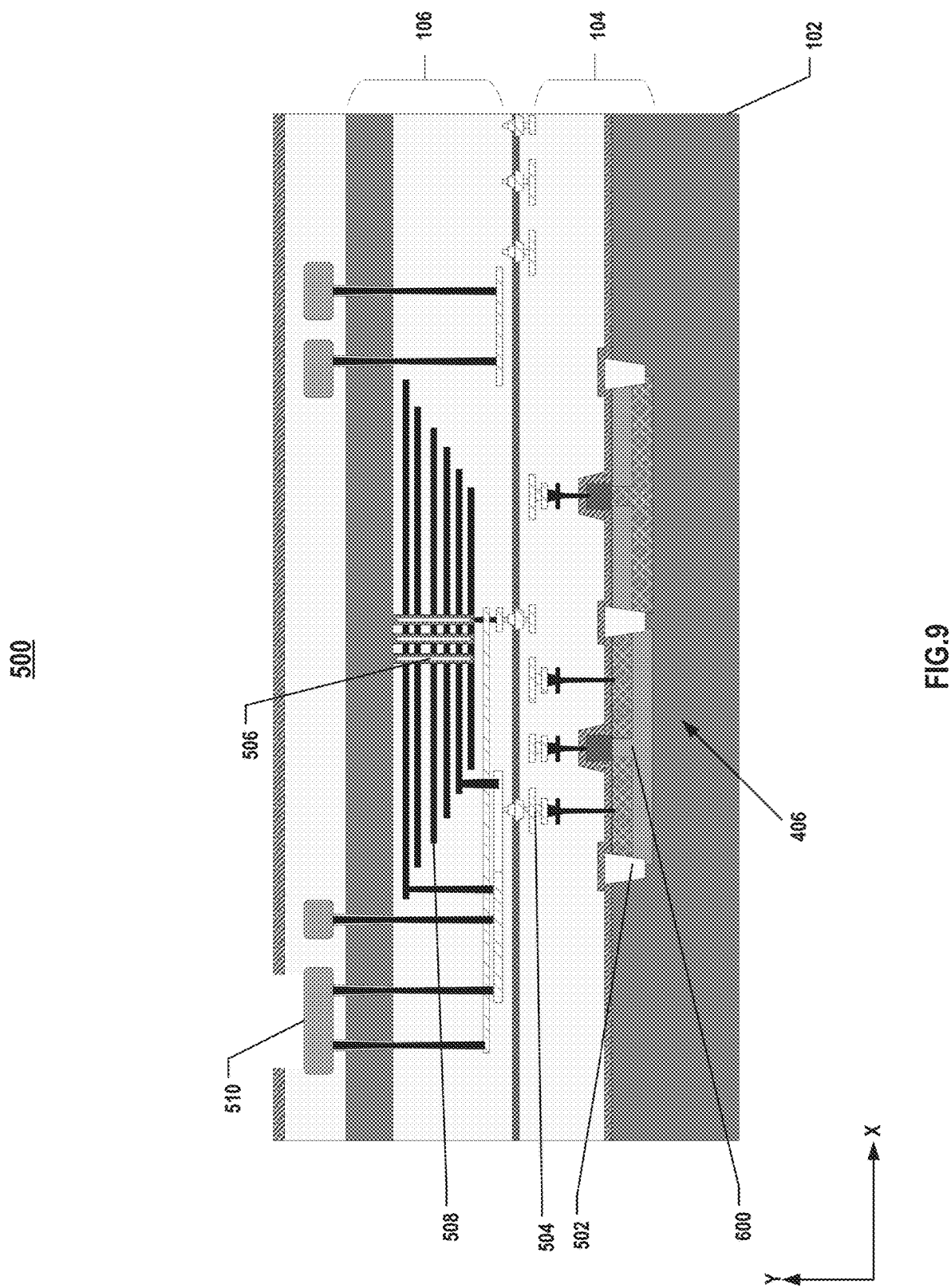
Figure 10:
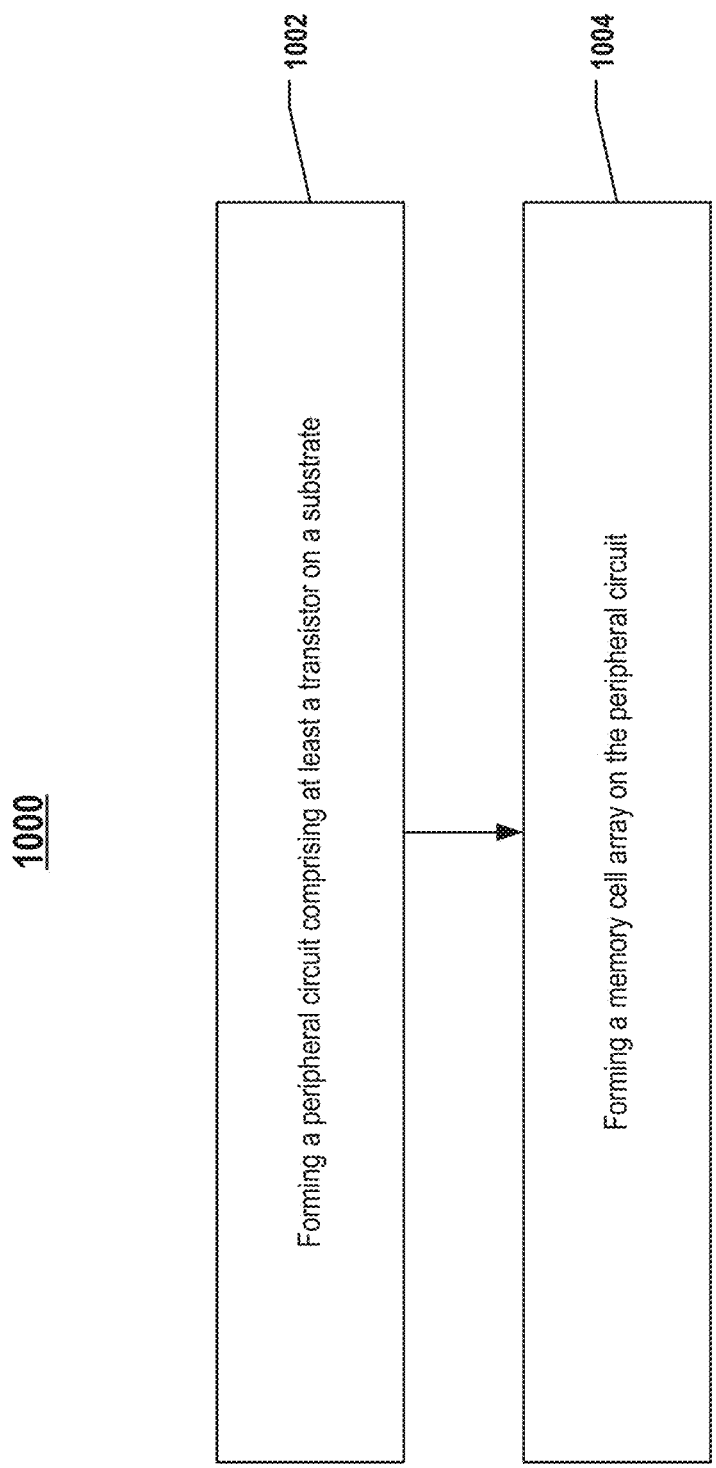
FIGS. 10-11 illustrate a flowchart of a method for forming a 3D memory device, according to some aspects of the present disclosure.
Figure 11:
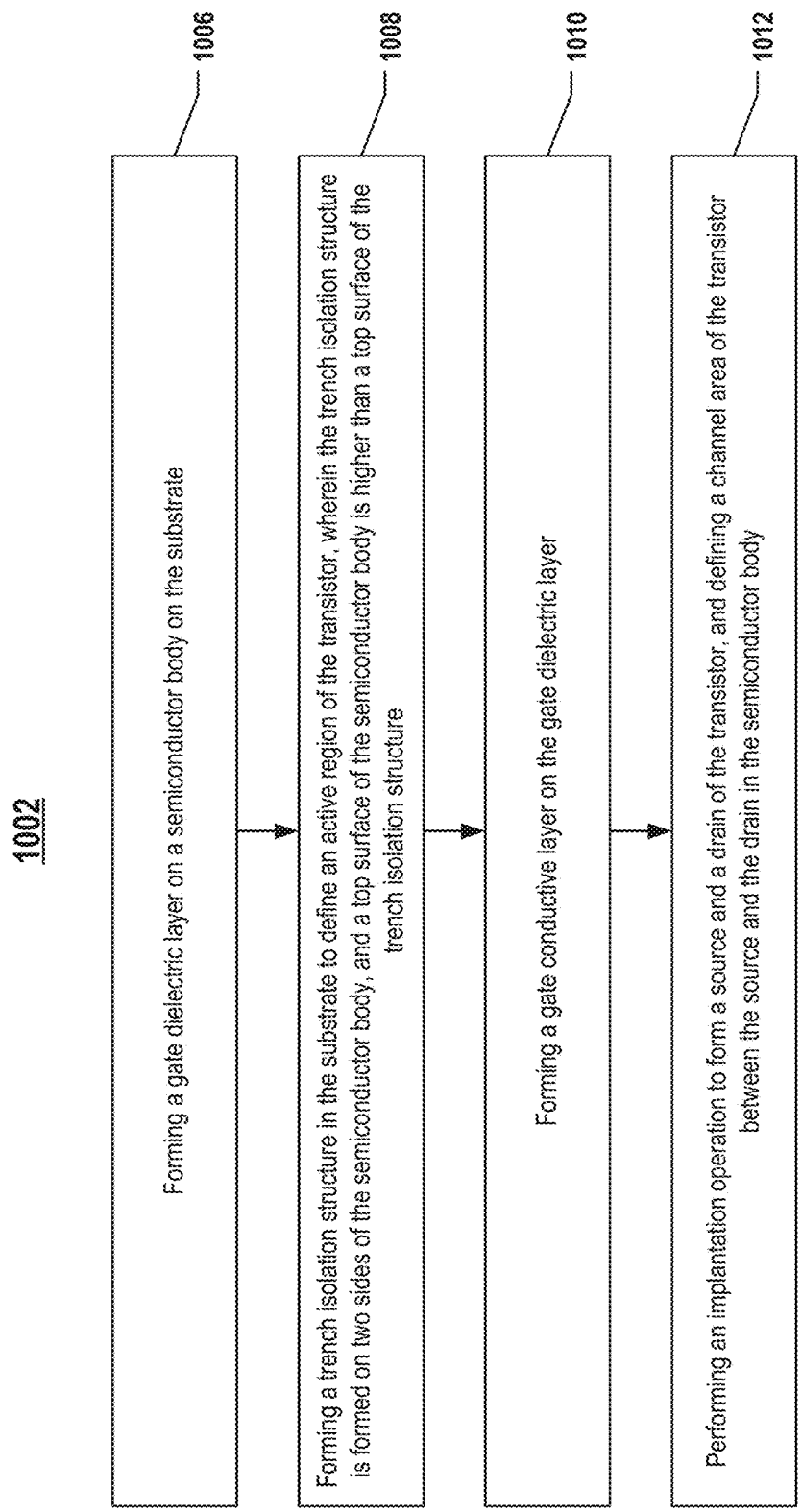

FIGS. 7-9 illustrate a fabrication process for forming 3D memory device 500, according to some aspects of the present disclosure. FIGS. 10-11 illustrate a flowchart of a method 1000 for forming 3D memory device 500, according to some aspects of the present disclosure. For the purpose of better describing the present disclosure, the cross-sections of 3D memory device 500 in FIGS. 7-9 and method 1000 in FIGS. 10-11 will be described together. It is understood that the operations shown in method 1000 are not exhaustive and that other operations may be performed as well before, after, or between any of the illustrated operations. Further, some of the operations may be performed simultaneously, or in a different order than shown in FIGS. 7-9 and FIGS. 10-11.

As shown in FIG. 7 and operation 1002 in FIG. 10, peripheral circuit 104 including at least one transistor 600 is formed on substrate 102. In some implementations, a plurality of transistors 600 may be formed on substrate 102. Substrate 102 may be a silicon substrate having single crystalline silicon. Transistor 600 is formed on one side of substrate 102. Transistor 600 may be formed by a plurality of processes including, but not limited to, photolithography, dry/wet etch, thin film deposition, thermal growth, implantation, chemical mechanical polishing (CMP), and any other suitable processes. In some implementations, doped regions are formed in substrate 102 by ion implantation and/or thermal diffusion, which function, for example, as wells, e.g., semiconductor body 608, and source/drain regions of the transistors. In some implementations, isolation regions (e.g., STIs) are also formed in substrate 102 by wet/dry etch and thin film deposition.

In some implementations, as shown in FIG. 11, operation 1002 may include operations 1006 to 1012. As shown in operation 1006 of FIG. 11, gate dielectric layer 604 is formed on semiconductor body 608. In some implementations, gate dielectric layer 604 may be formed by one or more thin film deposition processes including, but not limited to, chemical vapor deposition (CVD), physical vapor deposition (PVD), atomic layer deposition (ALD), or any combination thereof.

Then, as shown in operation 1008 of FIG. 11, trench isolation structure 502 is formed in substrate 102 to define an active region of transistor 600. Trench isolation structure 502 is formed on two sides of semiconductor body 608, and a top surface of semiconductor body 608 is higher than a top surface of trench isolation structure 502.

The height difference between semiconductor body 608 and trench isolation structure 502 may be formed during the formation of trench isolation structure 502. After forming a trench in substrate 102 and filling the trench with dielectric materials, the CMP and etch processes may be performed. The CMP process may be performed to make the top surfaces of semiconductor body 608 and trench isolation structure 502 coplanar, and the etch process may further remove a portion of the top of trench isolation structure 502, so as to make the top surface of trench isolation structure 502 lower than the top surface of semiconductor body 608. In some implementations, the etch process may make the top surface of trench isolation structure 502 50 nanometers to 200 nanometers lower than the top surface of semiconductor body 608.

As shown in operation 1010 of FIG. 11, gate conductive layer 602 is formed on gate dielectric layer 604. Because there is a height difference between the top surface of trench isolation structure 502 and the top surface of semiconductor body 608, after forming gate conductive layer 602 on gate dielectric layer 604, gate conductive layer 602 may have a staircase structure. In some implementations, gate conductive layer 602 includes polysilicon.

Then, as shown in operation 1012 of FIG. 11, an implantation operation is performed to form source and drain 606 of transistor 600. The channel area of transistor 600 is defined between source and drain 606 and under gate conductive layer 602 in semiconductor body 608. The staircase structure of gate conductive layer 602 includes a first top surface above the channel area and a second top surface outside the channel area, and the first top surface of gate conductive layer 602 above the channel area is formed higher than the second top surface of gate conductive layer 602 outside the channel area. In some implementations, the first top surface of gate conductive layer 602 above the channel area is formed 50 nanometers to 200 nanometers higher than the second top surface of gate conductive layer 602 outside the channel area.

In some implementations, transistor 600 is operated in a high-voltage (HV) potential. In some implementations, transistor 600 is operated between 3.3 volts to 20 volts. In some implementations, transistor 600 is operated above 5 volts. In some implementations, the channel length of transistor 600 is larger than 1 micrometer. In some implementations, the channel width of transistor 600 is larger than 500 nanometers.

After forming peripheral circuit 104, memory cell array 106 is formed on peripheral circuit 104. In some implementations, memory cell array 106 may be formed on peripheral circuit 104, or may be formed on another substrate and bonded to peripheral circuit 104, as shown in FIG. 8 and FIG. 9, which is not limited here.

Figure 12:
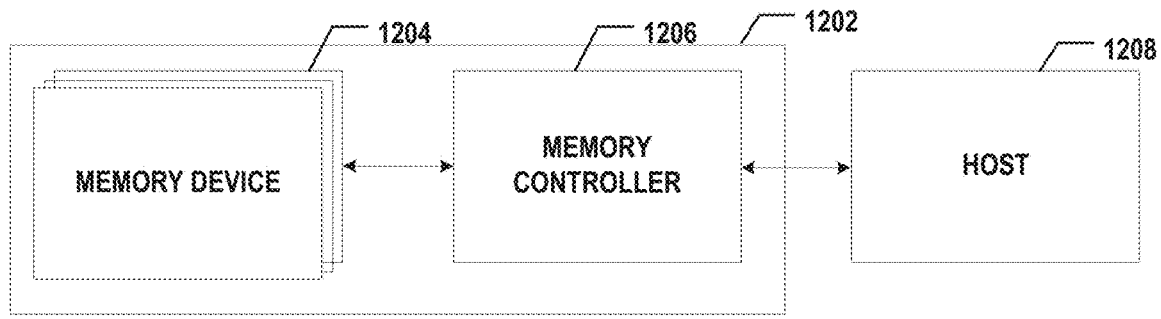
FIG. 12 illustrates a block diagram of an exemplary system having a memory device, according to some aspects of the present disclosure.

FIG. 12 illustrates a block diagram of a system 1200 having a memory device, according to some aspects of the present disclosure. System 1200 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 12, system 1200 can include a host 1208 and a memory system 1202 having one or more memory devices 1204 and a memory controller 1206. Host 1208 can be a processor of an electronic device, such as a central processing unit (CPU), or a system-on-chip (SoC), such as an application processor (AP). Host 1208 can be configured to send or receive the data to or from memory devices 1204.

Memory device 1204 can be any memory devices disclosed herein, such as 3D memory devices 100 and 500. The transistors in the peripheral circuits of memory device 1204 may include a gate stack having a staircase shape, so that can enhance the control of the well region (the channel area) of the transistor to improve the body effect of the transistor. As a result, the operation speed of the transistors in the peripheral circuits of the 3D memory device can be further improved.

Memory controller 1206 is coupled to memory device 1204 and host 1208 and is configured to control memory device 1204, according to some implementations. Memory controller 1206 can manage the data stored in memory device 1204 and communicate with host 1208. In some implementations, memory controller 1206 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 1206 is designed for operating in a high duty-cycle environment SSDs or embedded multi-media-cards (eMMCs) used as data storage for mobile devices, such as smartphones, tablets, laptop computers, etc., and enterprise storage arrays. Memory controller 1206 can be configured to control operations of memory device 1204, such as read, erase, and program operations. In some implementations, memory controller 1206 is configured to control the array of memory cells through the first peripheral circuit and the second peripheral circuit. Memory controller 1206 can also be configured to manage various functions with respect to the data stored or to be stored in memory device 1204 including, but not limited to bad-block management, garbage collection, logical-to-physical address conversion, wear leveling, etc. In some implementations, memory controller 1206 is further configured to process error correction codes (ECCs) with respect to the data read from or written to memory device 1204. Any other suitable functions may be performed by memory controller 1206 as well, for example, formatting memory device 1204. Memory controller 1206 can communicate with an external device (e.g., host 1208) according to a particular communication protocol. For example, memory controller 1206 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 13A:
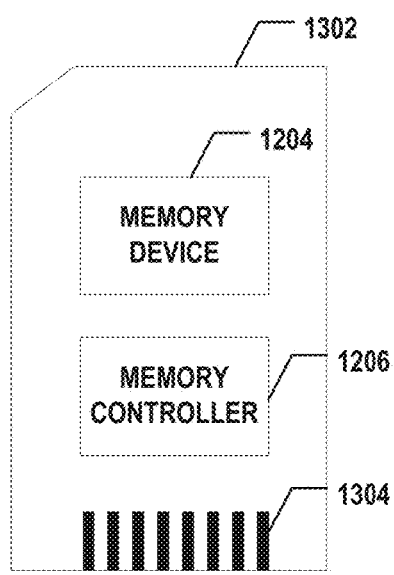
FIG. 13A illustrates a diagram of an exemplary memory card having a memory device, according to some aspects of the present disclosure.
Figure 13B:
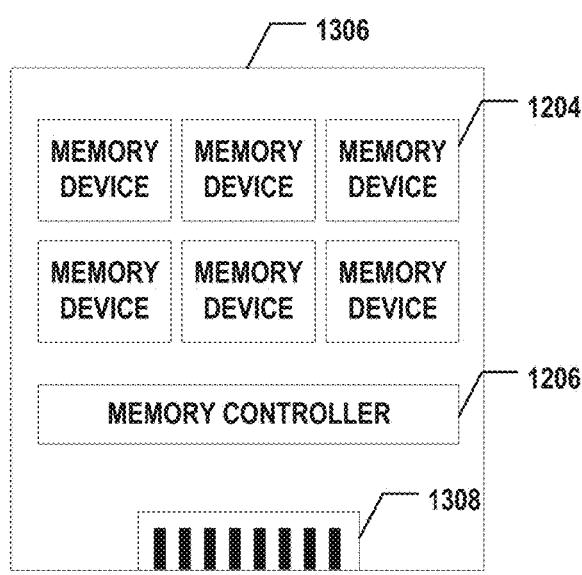
FIG. 13B illustrates a diagram of an exemplary solid-state drive (SSD) having a memory device, according to some aspects of the present disclosure.

Memory controller 1206 and one or more memory devices 1204 can be integrated into various types of storage devices, for example, be included in the same package, such as a universal Flash storage (UFS) package or an eMMC package. That is, memory system 1202 can be implemented and packaged into different types of end electronic products. In one example as shown in FIG. 13A, memory controller 1206 and a single memory device 1204 may be integrated into a memory card 1302. Memory card 1302 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 1302 can further include a memory card connector 1304 coupling memory card 1302 with a host (e.g., host 1208 in FIG. 12). In another example as shown in FIG. 13B, memory controller 1206 and multiple memory devices 1204 may be integrated into an SSD 1306. SSD 1306 can further include an SSD connector 1308 coupling SSD 1306 with a host (e.g., host 1208 in FIG. 12). In some implementations, the storage capacity and/or the operation speed of SSD 1306 is greater than those of memory card 1302.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A three-dimensional (3D) memory device, comprising:
a substrate;
a peripheral circuit disposed on the substrate;
a memory cell array disposed above the peripheral circuit and comprising a plurality of conductor/dielectric layer pairs; and
a plurality of memory strings, each of the memory strings extending through the memory cell array,
wherein the peripheral circuit comprises at least a transistor disposed on the substrate, and the transistor comprises a gate stack,
wherein the gate stack of the transistor comprises a staircase structure, and an operational voltage of the transistor is above 5 volts.

2. The 3D memory device of claim 1, wherein the staircase structure of the gate stack comprises a first top surface above a channel area of the transistor and a second top surface outside the channel area of the transistor, and the first top surface is higher than the second top surface.

3. The 3D memory device of claim 2, wherein the first top surface of the gate stack is 50 nanometers to 200 nanometers higher than the second top surface of the gate stack.

4. The 3D memory device of claim 3, wherein a channel length of the transistor is larger than 1 micrometer.

5. The 3D memory device of claim 4, wherein a channel width of the transistor is larger than 500 nanometers.

6. The 3D memory device of claim 1, wherein the transistor further comprises a trench isolation structure and a semiconductor body beneath the gate stack, and a top surface of the semiconductor body is higher than a top surface of the trench isolation structure.

7. The 3D memory device of claim 6, wherein the top surface of the semiconductor body is 50 nanometers to 200 nanometers higher than the top surface of the trench isolation structure.

8. The 3D memory device of claim 7, wherein the gate stack comprises polysilicon.

9. A system, comprising:
a three-dimensional (3D) memory device configured to store data, the 3D memory device comprising:
a substrate;
a peripheral circuit disposed on the substrate;

a memory cell array disposed above the peripheral circuit and comprising a plurality of conductor/dielectric layer pairs; and a plurality of memory strings, each of the memory strings extending through the memory cell array, wherein the peripheral circuit comprises at least a transistor disposed on the substrate, and the transistor comprises a gate stack, wherein the gate stack of the transistor comprises a staircase structure, and an operational voltage of the transistor is above 5 volts; and a memory controller coupled to the 3D memory device and configured to control operations of the plurality of memory strings through the peripheral circuit.

10. A three-dimensional (3D) memory device, comprising:

a substrate;

a peripheral circuit disposed on the substrate, the peripheral circuit comprising:

at least a transistor disposed on the substrate, the transistor comprising:

a semiconductor body disposed on the substrate;

two trench isolation structures disposed on two sides of the semiconductor body;

a gate stack disposed on the semiconductor body and the two trench isolation structures, wherein the gate stack of the transistor comprises a staircase structure, and an operational voltage of the transistor is above 5 volts.

11. The 3D memory device of claim 10, wherein a top surface of the two trench isolation structures is lower than a top surface of the semiconductor body.

12. The 3D memory device of claim 11, wherein the top surface of the two trench isolation structures is 50 nanometers to 200 nanometers lower than the top surface of the semiconductor body.

13. The 3D memory device of claim 10, wherein the semiconductor body comprises single crystalline silicon.

14. The 3D memory device of claim 10, wherein the gate stack comprises a gate dielectric layer and a gate conductive layer, the gate dielectric layer is disposed on the semiconductor body, and the gate conductive layer is disposed on the gate dielectric layer and the two trench isolation structures.

15. The 3D memory device of claim 14, wherein the gate conductive layer comprises doped polysilicon.

16. The 3D memory device of claim 10, wherein the transistor further comprises a drain and a source separated by the gate stack on a plan view of the transistor.

17. The 3D memory device of claim 10, wherein the staircase structure of the gate stack of the transistor comprises at least two flights having different heights of top surfaces.

18. The 3D memory device of claim 17, wherein the gate stack above the semiconductor body has a first top surface, and the gate stack outside the semiconductor body has a second top surface lower than the first top surface.

19. The 3D memory device of claim 18, wherein a height difference between the first top surface and the second top surface is between 50 nanometers to 200 nanometers.

20. The 3D memory device of claim 10, wherein the gate stack covers a top of the semiconductor body and a portion of side of the semiconductor body.

* * * * *